(12) United States Patent
Bullock

(10) Patent No.: US 8,745,245 B1
(45) Date of Patent: Jun. 3, 2014

(54) SYSTEM AND METHOD FOR OFFLINE DETECTION

(75) Inventor: Nathan Bullock, Kitchener (CA)

(73) Assignee: Google Inc., Mountain View, CA (US)

( * ) Notice: Subject to any disclaimer, the term of this patent is extended or adjusted under 35 U.S.C. 154(b) by 407 days.

(21) Appl. No.: 13/233,552

(22) Filed: Sep. 15, 2011

(51) Int. Cl.
  *G06F 15/16* (2006.01)
  *H04L 12/26* (2006.01)
  *G06F 17/00* (2006.01)

(52) U.S. Cl.
  CPC ............ *H04L 12/2647* (2013.01); *G06F 17/60* (2013.01)
  USPC .......................................... 709/227; 709/228

(58) Field of Classification Search
  CPC ........................... H04L 12/2647; G06F 17/60
  USPC .................... 709/237, 233; 370/229, 235–238
  See application file for complete search history.

(56) References Cited

U.S. PATENT DOCUMENTS

| | | | | |
|---|---|---|---|---|
| 6,018,516 | A * | 1/2000 | Packer | 370/231 |
| 6,526,433 | B1 | 2/2003 | Chang et al. | |
| 6,606,661 | B1 * | 8/2003 | Agrawal et al. | 709/227 |
| 7,124,181 | B1 | 10/2006 | Magdych et al. | |
| 7,219,268 | B2 | 5/2007 | Adkisson et al. | |
| 7,484,011 | B1 * | 1/2009 | Agasaveeran et al. | 709/250 |
| 7,493,394 | B2 | 2/2009 | Zavalkovsky et al. | |
| 7,953,870 | B1 * | 5/2011 | Reeves et al. | 709/228 |
| 8,468,196 | B1 * | 6/2013 | Roskind et al. | 709/203 |
| 8,495,222 | B2 * | 7/2013 | Yamamoto | 709/227 |
| 2002/0120727 | A1 * | 8/2002 | Curley et al. | 709/223 |
| 2004/0260831 | A1 * | 12/2004 | Dyck et al. | 709/233 |
| 2005/0004822 | A1 * | 1/2005 | Elgrably | 705/7 |
| 2006/0031553 | A1 * | 2/2006 | Kim | 709/231 |
| 2007/0299965 | A1 * | 12/2007 | Nieh et al. | 709/224 |
| 2011/0106940 | A1 * | 5/2011 | Chauvin et al. | 709/224 |

OTHER PUBLICATIONS

Ed Norton Engineering Society. "Detecting offline status in HTML 5." Posted by Jim. Oct. 4, 2010. Retrieved from http://ednortonengineeringsociety.blogspot.com/2010/10/detecting-offline-status-in-html-5.html on May 18, 2011.

* cited by examiner

*Primary Examiner* — Shirley Zhang
(74) *Attorney, Agent, or Firm* — McDonnell Boehnen Hulbert & Berghoff LLP

(57) ABSTRACT

Systems and methods of offline detection are disclosed. The method includes generating a timeout value for offline detection at a plurality of clients. The method includes receiving a request from a client of the plurality of clients, sending an initial response to the client immediately after receiving the request from the client, sending one or more additional responses to the client, receiving timing information from the client, aggregating timing information received from the plurality of clients using a processor, and generating at least one timeout value based on the aggregated timing information.

22 Claims, 5 Drawing Sheets

SYSTEM AND METHOD FOR OFFLINE DETECTION

TECHNICAL FIELD

The present invention relates in general to offline detection.

BACKGROUND

The Internet is a global system of interconnected computer networks that provides for global communication. The Internet carries various information resources and services, including the World Wide Web (WWW) and electronic mail (e-mail). The WWW is a client-server model that includes web servers that provide access to documents via Hypertext Transfer Protocol (HTTP). Documents on the web servers are identified using Uniform Resource Locations (URLs). The documents and other content provided by web servers can be accessed by clients by way of a web browser application, such as Microsoft Internet Explorer or Google Chrome.

The WWW now includes dynamic content, wherein documents can be dynamically generated by a web server based on input provided by a client or based on information included a database. Further, documents can include scripting elements that allow for certain computing tasks to be performed on a client using the script provided by the server. For example, a document may include a script that provides for sending a background request to a server to send or receive additional information without having to load a completely new document.

SUMMARY

Disclosed herein are embodiments of systems, methods, and apparatuses relating to offline detection.

One aspect of the disclosed embodiments is a method of generating a timeout value for offline detection at a plurality of clients. The method includes receiving a request from a client of the plurality of clients, sending an initial response to the client immediately after receiving the request from the client, sending one or more additional responses to the client, receiving timing information from the client, aggregating timing information received from the plurality of clients using a processor, and generating at least one timeout value based on the aggregated timing information.

Another aspect of the disclosed embodiments is a method of offline detection. The method includes collecting a dataset of timing information from a plurality of clients using a processor, the timing information including at least one network delay derived using at least one background request and at least one initial response, wherein at least some of the initial responses are sent immediately upon receipt of a background request, generating at least one timeout value based on a statistical analysis of the dataset of timing information, and sending at least one of the generated timeout values to a client to facilitate offline detection by the client.

Another aspect of the disclosed embodiments is a method of detecting an offline state of a client with respect to one or more servers. The method includes receiving a document from the one or more servers, sending a first background request to the one or more servers based on script included in the document, receiving a first initial response from the one or more servers in response to the background request, calculating a network delay based on a difference in time between the sending of first background request and the receipt of first initial response, sending the network delay to the one or more servers, and receiving one or more additional responses from the one or more servers in response to the first background request.

Another aspect of the disclosed embodiments is computing system for offline detection. The computing system includes one or more computing devices each having at least one memory and at least one processor, the computing devices configured to execute instructions stored in at least one memory to: access a dataset of timing information collected from a plurality of clients, the timing information including at least one network delay determined based on a difference in time between a send time of a background request and a receipt time of an initial response sent by a server immediately upon receipt of the background request, process at least one timeout value generated using a statistical analysis of the dataset of timing information, store the at least one timeout value in the at least one memory, and send at least one of the generated timeout values to a client configured to use the at least one generated timeout value to detect an offline state.

Another aspect of the disclosed embodiments is computing system for offline detection. The computing system includes a timing information receiver for collecting a dataset of timing information from a plurality of clients, the timing information including a network delay determined based on a difference in time between a send time of a background request and a receipt time of an initial response sent by a server immediately upon receipt of the background request, and a timeout sender configured to select a timeout value generated from the dataset of timing information and send the selected timeout value to a client.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
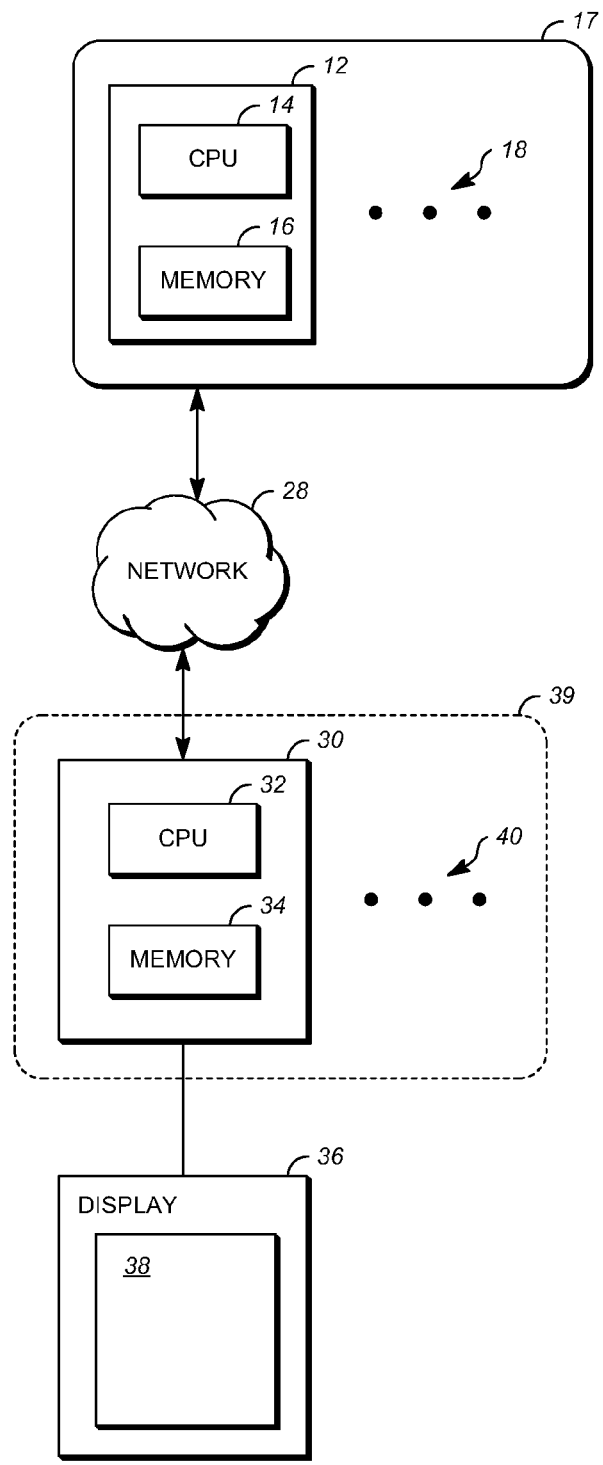
FIG. 1 is a diagram of a client-server system.

FIG. 1 is a diagram of a client-server system 10. Server 12 can be, for example, a computer having an internal configuration of hardware including a processor such as a central processing unit (CPU) 14 and a memory 16. CPU 14 can be a controller for controlling the operations of server 12. The CPU 14 is connected to memory 16 by, for example, a memory bus. Memory 16 can include random access memory (RAM) or any other suitable memory device. Memory 16 can store data and program instructions which are used by the CPU 14. Other suitable implementations of server 12 are possible.

The server 12 can be the only server or can be one of a group of servers 17 that includes additional servers 18. The group of servers 17 can be implemented as a computing cluster whereby the server 12 and additional servers 18 share resources, such as storage memory, and load-balance the processing of requests to the server. The group of servers 17 can alternatively be a cloud computing service. For example, a cloud computing service can include hundreds or thousands of servers configured to provide scalable computing resources. In a cloud computing service, computing tasks can be performed on one or more servers or other computing devices included within the cloud computing service.

The above are only exemplary implementations of the group of servers 17, and any distributed computing model can be used in their place. As used herein and in the claims, the term "server" is understood to include any combination or implementation of servers, server groups, or any other configuration of computing devices of any kind.

A network 28 connects the servers in the group of servers 17 and a client 30 and any additional clients 40 in a group of clients 39. Network 28 is, for example, the Internet. Network 28 can also be or include a local area network (LAN), wide area network (WAN), virtual private network (VPN), or any other means of transferring data between the servers 17 and clients 39

The client 30, in one example, can be a desktop computer having an internal configuration of hardware including a processor such as a central processing unit (CPU) 32 and a memory 34. CPU 32 is a controller for controlling the operations of client 30. CPU 32 can be connected to memory 34 by, for example, a memory bus. Memory 34 may be RAM or any other suitable memory device. Memory 34 stores data and program instructions which are used by CPU 32. Other suitable implementations of client 30 are possible, including handheld computing devices, laptops, tablets, or mobile telephones.

A display 36 configured to display a graphical user interface can be connected to client 30. Display 36 may be implemented in various ways, including by a liquid crystal display (LCD) or a cathode-ray tube (CRT). The display 36 can be configured to display application windows including a web browser application window 38 on client 30.

Other implementations of the client-server system 10 are possible. For example, one implementation can omit the group of servers 17 and additional servers 18 and include only a single server 12. In another implementation, there may only be one client 30 instead of the group of clients 39 and additional clients 40. In another implementation, additional components may be added to the client-server system 10. For example, one or more peripherals, such as a video camera can be attached to, or otherwise included in, client 30 or some of the additional clients 40.

Figure 2:
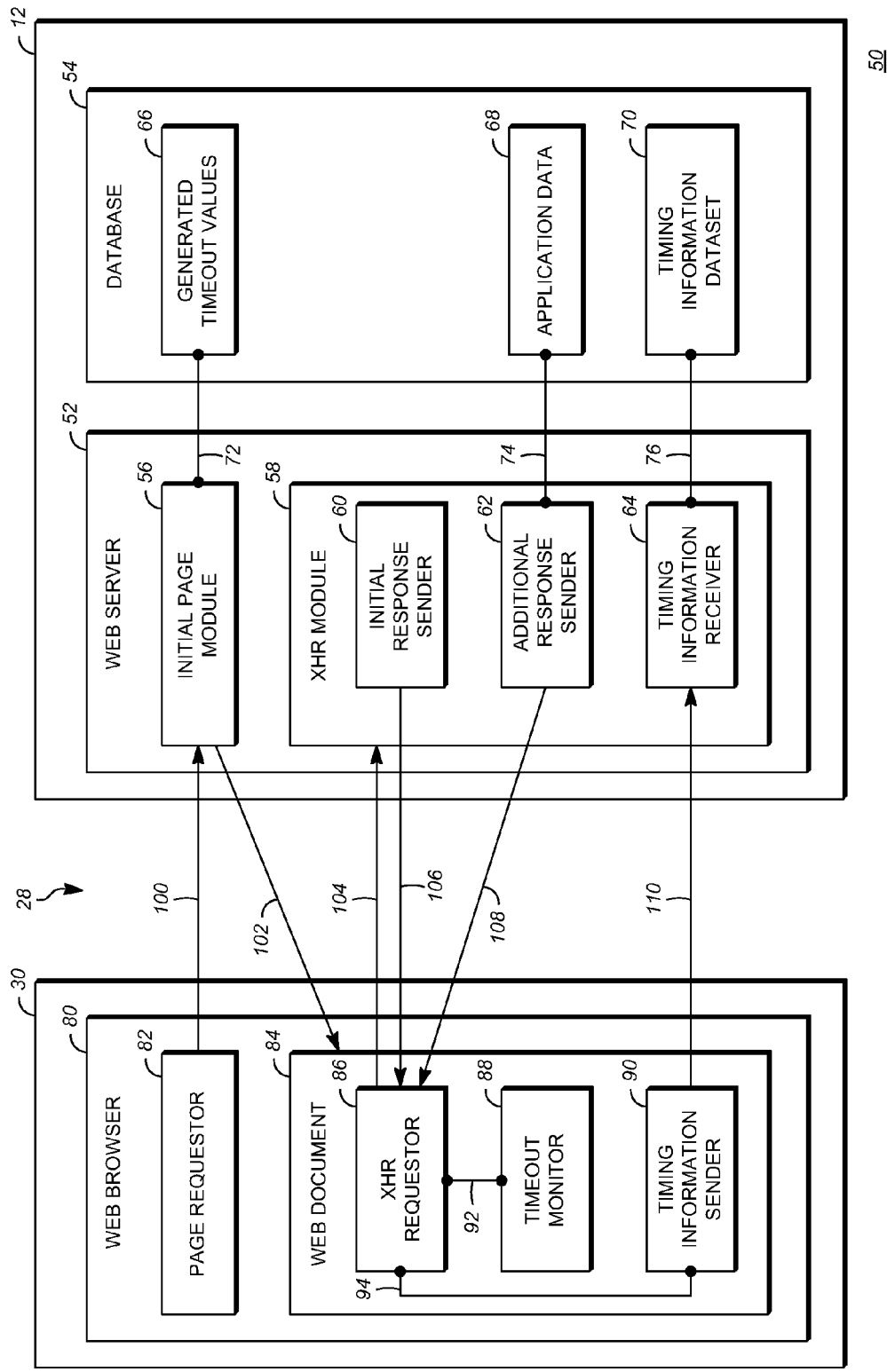
FIG. 2 is a schematic of an offline detection system within the client-server system of FIG. 1.

FIG. 2 is a schematic of an offline detection system 50 within the client-server system 10 of FIG. 1. The offline detection system is implemented within the client-server system 10 using server 12, client 30, and network 28. A web server 52 and database 54 is implemented on server 12. Included in the web server 52 is an initial page module 56 and a XMLHTTPRequest (XHR) module 58. The XHR module includes an initial response sender 60, additional response sender 62, and timing information receiver 64. Database 54 includes storage for generated timeout values 66, application data 68, and timing information dataset 70. The web server 52 and database 54 including data links 72, 74, and 76.

A web browser 80 is implemented on client 30. The web browser 80 includes a page requestor 82 and a web document 84. The web document 84 includes a XHR requestor 86, timeout monitor 88, and a timing information sender 90. The web browser 80 includes data links 92 and 94. The web browser 80 and/or web document 84 is displayed using web browser application window 38.

The page requestor 82 is configured to send a page request 100 over the network 28 to the initial page module 56. The page request 100 includes, for example, a URL. The initial page module 56 receives the page request 100 and retrieves or generates a page based on the page request 100. The page is, for example, a Hyper Text Markup Language (HTML) document that includes JavaScript code and Cascading Style Sheets (CSS). However, the page can include any content that the web browser 80 can receive. The page will include a generated timeout value obtained from the generated timeout values 66 via data link 72.

The initial page module 56 sends the page to the web browser 80 via page response 102 to enable the creation or change of web document 84. Web document 84 is a construct that represents the page in the web browser 80. Web document 84 can include a parsed version of the page, for example, in a form of a document object model (DOM). The page will contain JavaScript code or other program that implements and/or creates the XHR requestor 86, timeout monitor 88, and timing information sender 90. Alternatively, the page can reference another page that includes one or more of these elements.

The XHR requestor 86 is configured to send and receive data via the web browser's 80 XHR functionality. XHR allows for the web browser 80 to send and receive data from a server in the background without reloading or changing the web document 84 with another page. Instead, the web document 84 can be updated incrementally using XHR and scripting, such as Javascript. Such functionality is commonly referred to Asynchronous Javascript And XML (AJAX), wherein eXtensible Markup Language (XML) is the data format used in the XHR requests. While XHR and AJAX are specifically referred to herein, any scheme of sending and receiving data in the background for inclusion in web document 84 by web browser 80 can be used.

When initiated by script included in the web document 84, XHR requestor 86 sends a background request 104 to the XHR module 58 in web server 52. The background request 104 can include any request for information or processing. For example, the background request 104 can be to a URL on the web server 52 that provides information to the web document 84 from application data 68. In an alternative example, the background request 104 can include information to be stored in application data 68.

Upon receipt of the background request 104 by XHR module 58, initial response sender 60 sends an initial response 106 back to XHR requester 86. The initial response 106 functions as an acknowledgement by the XHR module 58 that the background request 104 has been received. As such, the initial response 106 typically will not include a substantive response to background request 104. In other words, a characteristic of initial response 106 is that it requires only minimal processing by the server 12, which enables it to be sent to the client 30 within a short time of receiving the background request 104.

The time from when the background request 104 is sent by client 30 and the initial response 106 is received by client 30 is an initial response delay. The initial response delay includes two components: a network delay and a server delay. The network delay includes the time that it takes for background request 104 to reach the server 12 after being sent by client 30 and the time that it takes for initial response 106 to reach the client 30 after being sent by server 12. The server delay includes the time between when the server 12 receives background request 104 and sends initial response 106. In this context, initial response 106 can also be considered to be a timing response.

The initial response sender 60 is configured to send the initial response 106 prior to any additional response(s) 108. In one exemplary implementation, initial response 106 can be sent before or parallel with any database queries that are performed on application data 68 responsive to background request 104. In some implementations, the initial response 106 is sent immediately after the server 12 receives background request 104. The term immediately, as used in the context of initial response 106, contemplates some server delay. The server delay can be, for example, related to the processing of the background request and the processing of the initial response. In some implementations of servers 12 and web servers 52, the server delay can be partially attributed to buffering of initial response 106 prior to additional transmission over network 28. In some implementations, buffering can be reduced or avoided by, for example, "flushing" the initial response 106 to the network by initial response sender 60, creating initial response 106 at a size that prevents buffering by server 12, or by configuring server 12 to avoid buffering by initial response sender 60.

Generally, a smaller server delay results in faster offline detection by client 30. Herein, the network delay can be considered to be the same as the initial response delay, since the server delay can be a relatively small delay, especially when a substantive response is not included in initial response 106. However, in other implementations, the network delay can be calculated differently. For example, the network delay can be calculated by making a predetermined or dynamic adjustment to the initial response delay on account of the server delay.

While the XHR requestor 86 is waiting for the initial response 106, it utilizes timeout monitor 88 via data link 92 to determine if the initial response 106 is not received within a network delay less than the generated timeout value included in the page. If it takes longer than the generated timeout value to receive initial response 106, then the timeout monitor 88 can trigger the web document 84 to enter an offline state.

When in the offline state, any later received initial response 106 or additional response(s) 108 can be discarded. In an alternative implementation, later received responses can trigger a return to an online state. If it takes less time than the generated timeout value to receive initial response 106, then the web document 84 will remain in or change to the online state. The effect of being in an online state or an offline state is dependent on the particular web document 84. In some implementations, a web document 84 may, for example, display an indication of the current state, notify the server 12, or change its operation based on the current state (or any combination thereof).

Additional response sender 62 sends one or more additional response(s) 108 to XHR requestor 86 as the information or processing requested by background request 104 is completed. The information or processing can require a measurable amount of time on server 12 to complete, and may involve using data link 74 to obtain data from or send data to application data 68. By using an initial response 106 to determine offline status rather than additional response(s) 108, the longer server delay of processing additional response(s) 108 is eliminated from the offline detection process, making the offline detection more responsive and reliable. In other words, a smaller timeout value can be utilized to detect an offline state because the server delay can be largely factored out of the timeout value. Smaller timeout values result in a faster response time for offline detection.

Once the initial response 106 is received by XHR requestor 86, the network or initial response delay is measured and sent to timing information sender 90 via data link 94. Timing information sender 90 compiles the network or initial response delay and other timing categories into timing information to be sent to timing information receiver 64 via timing information response 110. The timing categories can include information associated with the client 30. For example, timing categories can include IP address, network location, client device information (i.e. manufacturer, operating system, memory), and/or network carrier.

Timing information need not include personally identifiable information. To the extent that timing categories include information supplied by a client such as client 30 or other computing device, in some implementations, the operator of such device can opt-in or opt-out of the collection of such information, including information that may be personally identifiable. In some cases, such information can be collected or stored in an anonymous fashion or otherwise safeguarded to prevent unauthorized access, re-distribution or use.

After the timing information response 110 is received by timing information receiver 64, the timing information is conveyed via data link 76 to timing information dataset 70 where the timing information is stored.

In this exemplary implementation, background request 104, initial response 106, and additional response(s) 108 are all sent using a single HTTP connection over network 28. The HTTP connection is kept open after initial response 106 is sent while the server 12 processes the background request 104 and sends one or more additional response(s) 108. The organization of data sent to the client 30 can be organized using various HTTP Streaming techniques to separate each of the responses at the client 30. However, in other implementations, multiple HTTP connections could be utilized. In other alternative implementations, other protocols can be used in conjunction with or instead of HTTP, such as the SPDY protocol promulgated by Google Inc.

With respect to timing information response 110, the timing information response may be sent by the client 30 at any suitable time selected by the client 30 or server 12. For example, the client 30 may include the timing information response 110 with a subsequent background request 104 to optimize network usage. Alternatively, the client 30 may send the timing information response 110 separately.

Within the offline detection system 50, the generated timeout values 66 are generated using timing information dataset 70. The generated timeout values 66 can be generated automatically on a periodic basis based on updates to timing information stored in timing information dataset 70. Alternatively, the generated timeout values 66 can be generated manually by, for example, an administrator based on the timing information dataset 70.

The generated timeout values 66 can include timeout values generated from the entire timing information dataset 70 or any subset of timing information dataset 70. For example, one or more timeout values may be generated for certain values or combination of values of timing categories. In one exemplary implementation, distinct timeout values can be generated for different network carriers. In another exemplary implementation, timeout values can be generated based on timing information collected within a certain time period (i.e. the last two weeks).

In either case, the timing information dataset 70 is evaluated using statistical analysis to generate the generated timeout values 66. For example, a standard deviation can be calculated on a set of timing information from the timing information dataset 70. Using the standard deviation, a timeout value can be generated based on, for example, a 99% confidence interval. Such a value would result in an incorrect detection of an offline state no more than 1% of the time. Other confidence intervals and other forms of statistical analysis may also be used in alternative implementations.

The configuration of offline detection system 50 is exemplary only, and other configurations are possible. For example, modules can be added, deleted, or modified in other implementations. For example, the XHR requestor 86 and timeout monitor 88 might be expressed as a single module in some implementations. In one implementation, the generated timeout values may not be stored in a database, and can be stored in the web pages themselves. While web server 52 and database 54 are shown within a "server" 12, it is understood that they may be implemented on separate servers within the group of servers 17. In another implementation, the requests and responses may be received and sent between one client and multiple servers.

The modules shown are conceptual constructs, and an implementation may implement the various modules in different ways. For example, the initial page module 56 and XHR module 58 can be or be included within one or more server-side scripting documents, such as a PHP interpretive scripting language document that is interpreted by web server 52. In another example, the web document 84 and page requestor 82 may be implemented differently within a given web browser 80.

Figure 3:
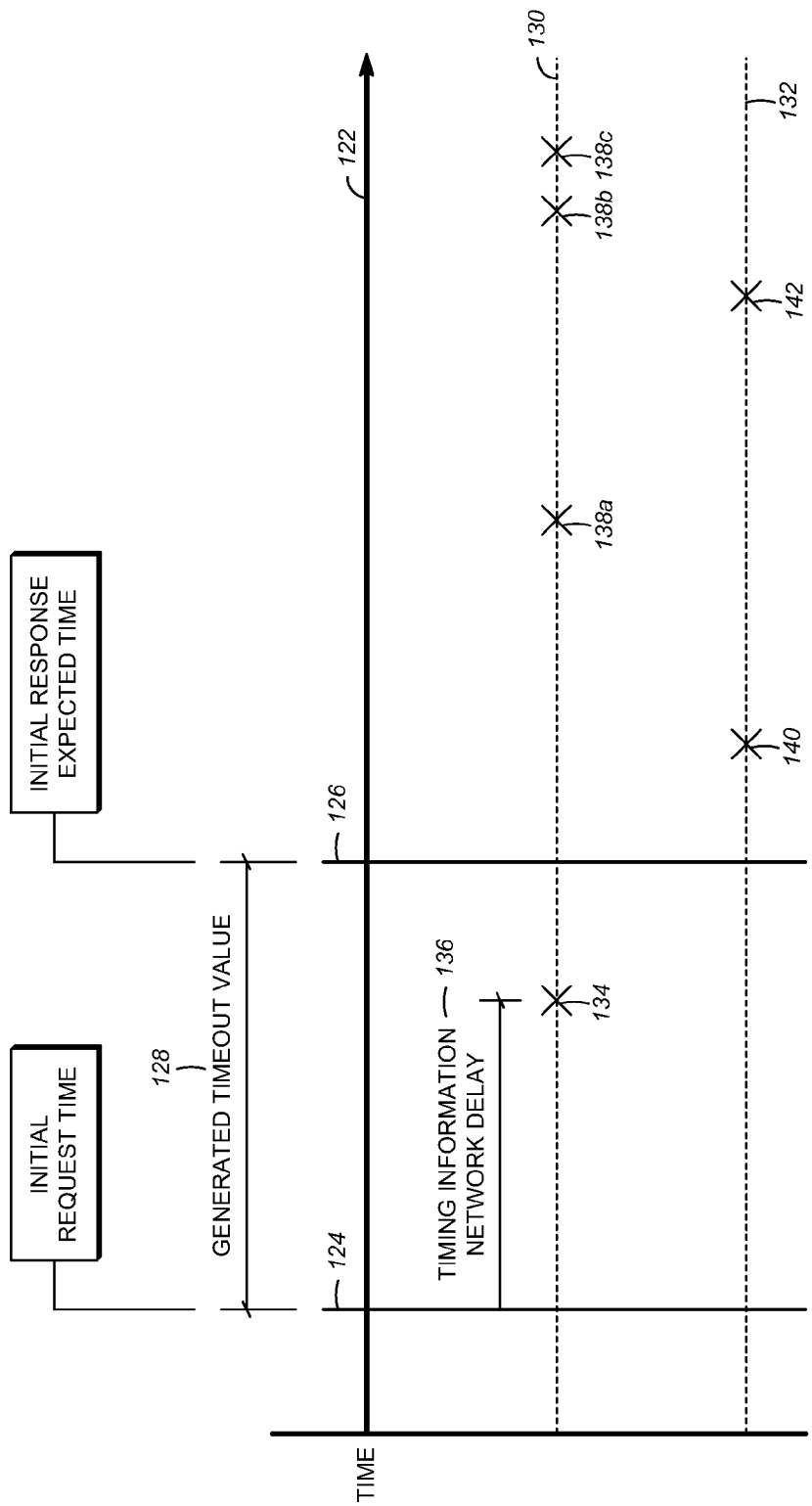
FIG. 3 is a timeline depicting offline detection within the offline detection system of FIG. 2.

FIG. 3 is a timeline 122 depicting offline detection within the offline detection system 50 of FIG. 2. On the timeline 122 there is an initial request time 124 and an initial response expected time 126. The difference between initial request time 124 and initial response expected time 126 is the generated timeout value 128. The initial request time 124 is the time at which the client 30 sends a background request 106 to the server 12. The initial response expected time 126 is determined using the generated timeout value 128, which is provided to the client 30 by server 12 in page response 102.

Included in FIG. 3 are exemplary timelines 130 and 132. Exemplary timelines 130 and 132 include hypothetical initial and additional response times that illustrate how online and offline states can be detected by timeout monitor 88.

Exemplary timeline 130 illustrates the detection of an online state. In this example, an initial response is received at initial response time 134. Since initial response time 134 is less than the initial response expected time 126, the client is kept in or changed to the online state. The timing information network delay 136 is measured within the web browser 80 and is transmitted to the server 12 using timing information sender 90. Since the client is in the online state, it will receive additional response(s) 138a-c and process them.

Exemplary timeline 132 illustrates the detection of an offline state. In this example, an initial response is received at an initial response time 140. Since the initial response time 140 was not received before initial response expected time 126, the client 30 is kept in or changed to the offline state. Any later received additional response 142 can then be discarded by the client 30 since it is in the offline state.

Figure 4:
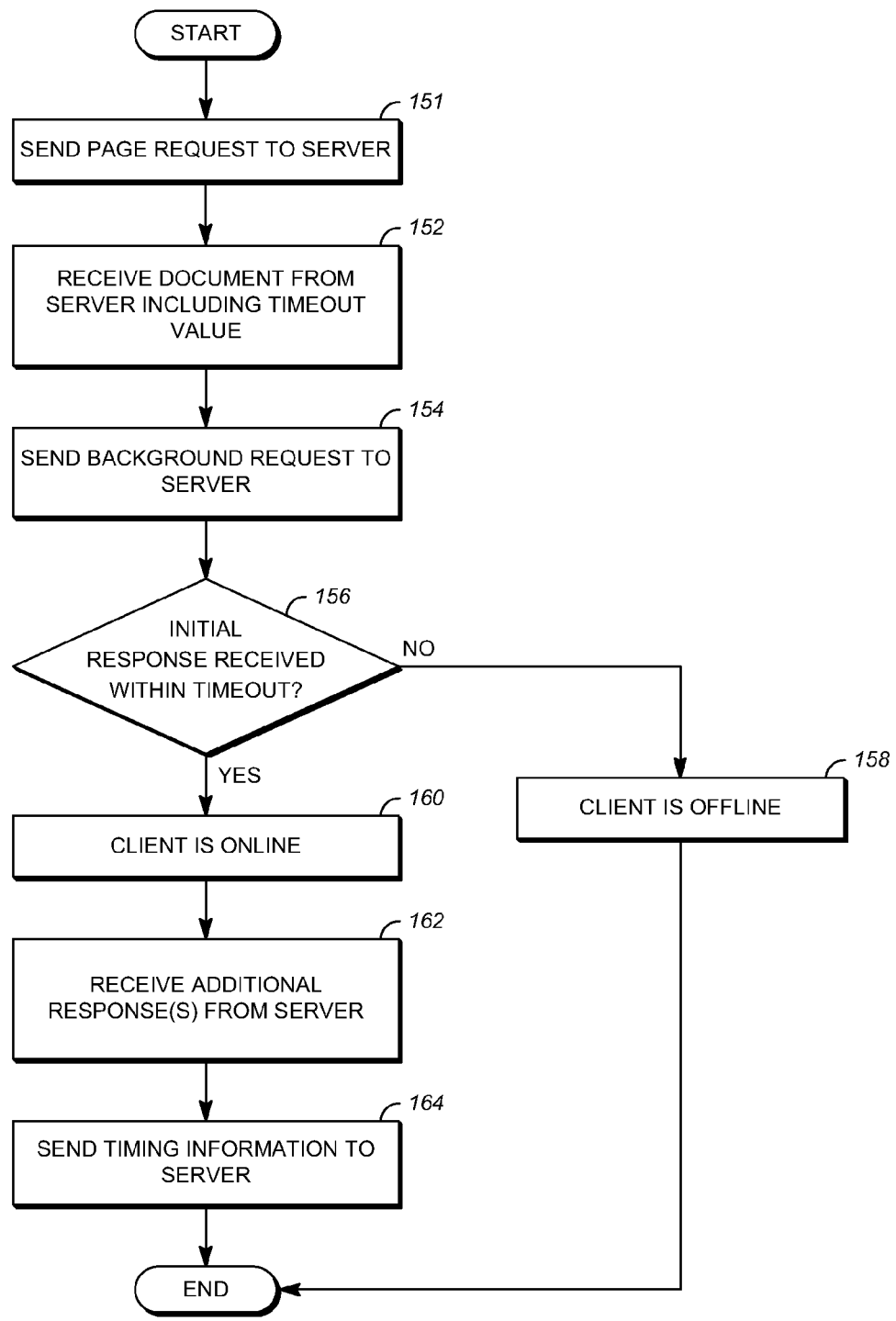
FIG. 4 is a flowchart of a process used by a client within the offline detection system of FIG. 2.

FIG. 4 is a flowchart of a process 150 used by client 30 within the offline detection system 50 of FIG. 2. The process 150 shown includes a subset of steps that would be performed by the client 30 that is illustrative of an implementation of offline detection system 50. At stage 151, page requestor 82 sends a page request 100 to web server 52. At stage 152, web browser 80 receives a document from server 12 responsive to page request 100 that includes a generated timeout value. The generated timeout value received by the client can be a value derived from a statistical analysis of timing information compiled by the server in timing information dataset 70. Once the document is loaded by web browser 80, background request 104 can be sent to the server 12 at stage 154.

At stage 156, the client 30 determines whether an initial response 106 is received within a timeout period based on the generated timeout value using timeout monitor 88. If an initial response 106 is not received within the timeout period (using the send time of the background request 104 as a starting time and the generated timeout value as a maximum delay), then the client is put into an offline state at stage 158. The offline state can be implemented in a number of different ways. The offline state may be a bit-flag that causes the display of an offline message within the web browser 80. Additionally, the offline state can be used to alter the operation of the web document 84 to, for example, used locally cached information instead of attempting to contact the server 12. When in the offline state, there may be functionality to, periodically or upon user initiation, perform another request to the server 12 to see if the connection is back in the online state.

Otherwise, if an initial response 106 is received within the generated timeout value, at stage 160, the client is put into the online state. If the client is already in the online state, this stage, in some implementations, can do nothing. However, if the client was previously in the offline state, the change in state may trigger various changes on the display 36 or in the operation of web document 84. The client 30 receives any additional response(s) from the server 12 at stage 162 since the client is in the online state. At stage 164, the client 30 sends timing information to the server 12 using timing information sender 90. As discussed previously, the client 30 compiles timing information using the measured network delay and relevant timing categories.

Figure 5:
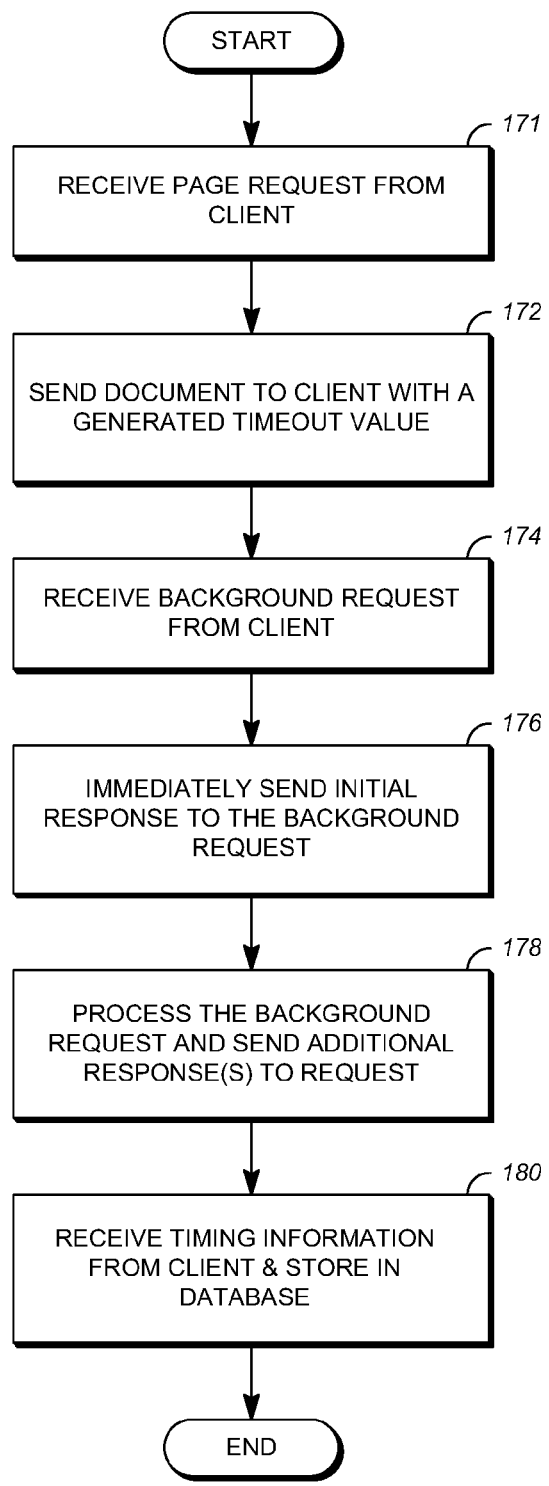
FIG. 5 is a flowchart of a process used by a server or a server group within the offline detection system of FIG. 2.

FIG. 5 is a flowchart of a process 170 used by a server 12 or a server group 17 within the offline detection system 50 of FIG. 2. At stage 171, the initial page module 56 receives a page request 100 from the client 30. At stage 172, the server 12, responsive to the page request 100, sends a document (i.e. page) to the client 30 that includes a generated timeout value. At stage 174, the server 12 receives from the client 30 a background request initiated based on the document previously sent. The server 12 immediately sends an initial response once the background request is received at stage 176. The server processes the background request and sends any required additional response(s) to the client 30 at stage 178. At stage 180, the server 12 receives timing information from the client and stores that information in the timing information dataset 70.

The embodiments of server 12 and/or client 30 (and the algorithms, methods, instructions etc. stored thereon and/or executed thereby) can be realized in hardware, software, or any combination thereof including, for example, IP cores, ASICS, programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server 12 and client 30 do not necessarily have to be implemented in the same manner.

Further, in one example, server 12 or client 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Server 12 and client 30 can, for example, be implemented on computers in a webmail system. Client 30 can be implemented on a device such as a hand-held communications device (i.e. a cell phone). In this instance, server 12 can exchange HTTP communications with the communications device. Other suitable server 12 and client 30 implementation schemes are available. For example, client 30 can be a personal computer rather than a portable communications device.

Implementations or portions of implementations of the above disclosures can take the form of a computer program product accessible from, for example, a computer-usable or computer-readable medium. A computer-usable or computer-readable medium can be any tangible device that can, for example, contain, store, communicate, or transport the program for use by or in connection with any processor. The medium can be, for example, an electronic, magnetic, optical, electromagnetic, or a semiconductor device. Other suitable mediums are also available. Such computer-usable or computer-readable media can be referred to as non-transitory media, and may include RAM or other volatile memory or storage devices that may change over time.

The exemplary approaches herein have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method comprising:
   receiving a request from a client of a plurality of clients;
   sending an initial response to the client immediately after receiving the request from the client;
   sending one or more additional responses to the client;
   receiving timing information from the client;
   aggregating timing information received from the plurality of clients using a processor;
   generating at least one timeout value based on the aggregated timing information;
   sending a generated timeout value to the client; and
   determining that the client is offline if the initial response is received by the client outside of a time period less than the generated timeout value, the time period beginning at a send time of the request.

2. The method of claim 1, further comprising:
   sending at least one of the generated timeout values to at least some of the plurality of clients.

3. The method of claim 2, wherein the method is performed using a server that includes a web server and in the context of a web application implemented using the web server, the web application configured to utilize at least one of the sent generated timeout values to detect if the web application is in an online state or an offline state, the web application further configured to perform specific operations responsive to the current state.

4. The method of claim 1, wherein the timing information includes a network delay and at least one timing category, the timing categories including at least one of: client device, client network address, or client location.

5. The method of claim 4, wherein generating the at least one timeout value comprises:
   identifying at least one timing category value; and
   generating a timeout value based on timing information associated with the at least one timing category value.

6. The method of claim 1, wherein generating a timeout value includes a statistical analysis of the aggregated timing information.

7. The method of claim 6, wherein generating a timeout value includes generating the timeout value using the statistical analysis and based on a confidence interval.

8. The method of claim 6, wherein generating the at least one timeout value comprises:
   generating a timeout value for each of one or more timing categories included in the aggregated timing information.

9. The method of claim 1, wherein sending the initial response to the client immediately after receiving the request includes sending the initial response before performing any database queries responsive to the background request from the client.

10. A method of offline detection comprising:
    collecting a dataset of timing information from a plurality of clients using a processor, the timing information including at least one network delay derived using at least one background request and at least one initial response, wherein at least some of the initial responses are sent immediately upon receipt of a background request;
    generating at least one timeout value based on a statistical analysis of the dataset of timing information;
    sending at least one of the generated timeout values to a client to facilitate offline detection by the client; and
    determining that the client is offline if an initial response is received by the client outside of a time period less than at least one generated timeout value, the time period being a network delay and beginning at a time of at least one background request.

11. The method of claim 10, wherein sending the initial response to the client immediately upon receipt of a background request includes sending the initial response before performing any database queries responsive to the background request from the client.

12. The method of claim 10, wherein the statistical analysis includes a predetermined confidence interval.

13. The method of claim 10, wherein generating at least one timeout value comprises:
    subdividing the dataset of timing information into category datasets based on timing categories included in the timing information; and
    generating timeout values associated with the category datasets.

14. The method of claim 13, wherein sending at least one of the generated timeout values to the client comprises:
    selecting a generated timeout value corresponding to a timing category associated with the client; and
    sending the selected generated timeout value to the client.

15. A method of detecting an offline state of a client with respect to one or more servers, the method comprising:
    receiving a document from the one or more servers;
    sending a first background request to the one or more servers based on script included in the document;
    receiving a first initial response from the one or more servers in response to the first background request;
    calculating a network delay based on a difference in time between the sending of the first background request and the receipt of the first initial response;
    sending the network delay to the one or more servers;
    receiving one or more additional responses from the one or more servers in response to the first background request;
    receiving a generated timeout value from the one or more servers; and
    determining that the client is offline if an initial response is received from the one or more servers outside of a time period less than the generated timeout value, the time period beginning at a time of the first background request.

16. The method of claim 15, further comprising:
determining that the client is online if an initial response is received from the one or more servers within the time period; and
receiving one or more additional responses from the one or more servers if the client is online.

17. The method of claim 15, wherein the document is an HTML document, the receiving and sending is performed using the HTTP protocol, and the background requests and initial responses are performed using one or more XMLHTTPRequests.

18. The method of claim 15, wherein the document includes a generated timeout value, and the method further comprises:
sending a second background request to the one or more servers based on instructions included in the document; and
determining that the client is offline if a second initial response is not received within a time period after sending the second background request that is less than the generated timeout value.

19. The method of claim 18, wherein receiving the one or more additional responses is accomplished using an XHR streaming technique so that the initial response and one or more additional responses are received using a single HTTP connection and the initial response is received from the one or more servers before the additional response is received.

20. The method of claim 15, wherein the method is performed using a web browser.

21. The method of claim 15, wherein sending the network delay to the one or more servers comprises:
sending to the one or more servers timing information including a network delay calculated as the difference in time from sending the initial request to receiving the initial response.

22. A computing system for offline detection comprising:
one or more computing devices each having at least one memory and at least one processor, the one or more computing devices configured to execute instructions stored in the at least one memory to cause the computing system to perform functions comprising:
accessing a dataset of timing information collected by the computing system from a plurality of clients, the timing information including at least one network delay determined based on a difference in time between a send time of a background request and a receipt time of an initial response sent by a server immediately upon receipt of the background request,
processing at least one timeout value generated using a statistical analysis of the dataset of timing information,
storing the at least one timeout value in the at least one memory,
sending at least one of the generated timeout values to a client configured to use the at least one generated timeout value to detect an offline state, and
determining that the client is offline if the receipt time of the initial response is outside of a time period less than at least one generated timeout value, the time period being a network delay beginning at the send time of the background request.

* * * * *